US010050936B2

(12) United States Patent
Roberson

(10) Patent No.: US 10,050,936 B2
(45) Date of Patent: *Aug. 14, 2018

(54) SECURITY DEVICE IMPLEMENTING NETWORK FLOW PREDICTION

(71) Applicant: Palo Alto Networks, Inc., Santa Clara, CA (US)

(72) Inventor: William A. Roberson, Scotts Valley, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 345 days.

This patent is subject to a terminal disclaimer.

(21) Appl. No.: 14/965,015

(22) Filed: Dec. 10, 2015

(65) Prior Publication Data

US 2016/0164836 A1    Jun. 9, 2016

Related U.S. Application Data

(63) Continuation of application No. 13/840,691, filed on Mar. 15, 2013, now Pat. No. 9,240,975.

(60) Provisional application No. 61/758,647, filed on Jan. 30, 2013.

(51) Int. Cl.
*H04L 29/06* (2006.01)
*H04L 29/08* (2006.01)

(52) U.S. Cl.
CPC ......... *H04L 63/0254* (2013.01); *H04L 63/02* (2013.01); *H04L 63/20* (2013.01); *H04L 67/142* (2013.01); *H04L 29/06* (2013.01); *H04L 63/08* (2013.01); *H04L 63/10* (2013.01)

(58) Field of Classification Search
CPC ......... H04L 29/06; H04L 63/08; H04L 63/20; H04L 63/02; H04L 63/0254; H04L 63/0227; H04L 67/14; H04L 67/142; H04L 63/10
USPC ....................................................... 370/389
See application file for complete search history.

(56) References Cited

U.S. PATENT DOCUMENTS

| 5,455,826 | A | 10/1995 | Ozveren et al. |
| 6,044,400 | A | 3/2000 | Golan et al. |
| 6,633,565 | B1 | 10/2003 | Bronstein et al. |
| 6,831,893 | B1 * | 12/2004 | Ben Nun ................ H04L 29/06 370/229 |

(Continued)

*Primary Examiner* — Michael Thier
*Assistant Examiner* — Rownak Islam
(74) *Attorney, Agent, or Firm* — Van Pelt, Yi & James LLP

(57) ABSTRACT

A security device for processing network flows is described, including: one or more packet processors configured to receive incoming data packets associated with network flows where a packet processor is assigned as an owner of network flows and each packet processor processes data packets associated with flows for which it is the assigned owner; and a packet processing manager configured to assign ownership of network flows to the packet processors where the packet processing manager includes a global flow table containing global flow table entries mapping network flows to packet processor ownership assignments and a predict flow table containing predict flow entries mapping predicted network flows to packet processor ownership assignments. A predict flow entry includes a predict key and associated packet processor ownership assignment. The predict key includes multiple data fields identifying a predicted network flow where one or more of the data fields have a wildcard value.

18 Claims, 12 Drawing Sheets

(56) References Cited

U.S. PATENT DOCUMENTS

| | | | |
|---|---|---|---|
| 7,016,367 | B1 | 3/2006 | Dyckerhoff |
| 7,447,777 | B1 | 11/2008 | Singh Ahuja et al. |
| 7,519,797 | B1 | 4/2009 | Stiehl et al. |
| 8,004,976 | B2 | 8/2011 | Janarthanan et al. |
| 8,045,548 | B1 * | 10/2011 | Menezes ............... H04L 69/22 |
| | | | 370/389 |
| 8,997,223 | B2 | 3/2015 | Roberson et al. |
| 2002/0075883 | A1 | 6/2002 | Dell et al. |
| 2003/0041168 | A1 | 2/2003 | Musoll |
| 2003/0061514 | A1 | 3/2003 | Bardsley et al. |
| 2005/0216764 | A1 | 9/2005 | Norton et al. |
| 2007/0204060 | A1 | 8/2007 | Higuchi et al. |
| 2010/0080233 | A1 | 4/2010 | Kwapniewski |
| 2010/0293280 | A1 | 11/2010 | Namihira |
| 2011/0219208 | A1 | 9/2011 | Asaad et al. |
| 2011/0235508 | A1 | 9/2011 | Goel |
| 2012/0210416 | A1 | 8/2012 | Mihelich et al. |
| 2014/0052836 | A1 | 2/2014 | Nguyen et al. |
| 2014/0126367 | A1 | 5/2014 | Stark |

* cited by examiner

Predict Flow Table ~200

| Predict Key | | | | Parent Flow ID | | | |
|---|---|---|---|---|---|---|---|
| SA | DA | SP | DP | Slot# | PP# | Flow Key | ~204 |
| SA | DA | * | DP | Slot# | PP# | Flow Key | ~206 |
| ⋮ | | | | | | | |
| SA | DA | SP | * | Slot# | PP# | Flow Key | ~208 |
| * | DA | SP | DP | Slot# | PP# | Flow Key | ~210 |
| ⋮ | | | | | | | |

FIG. 9

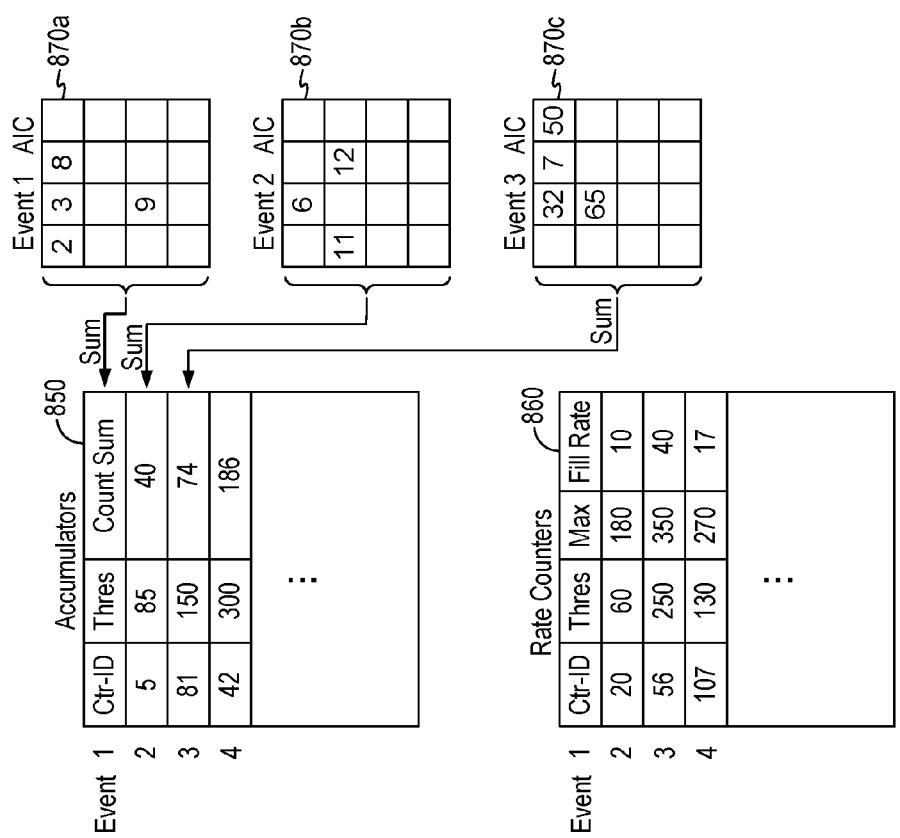

SECURITY DEVICE IMPLEMENTING NETWORK FLOW PREDICTION

CROSS REFERENCE TO OTHER APPLICATIONS

This application is a continuation of U.S. patent application Ser. No. 13/840,691, entitled SECURITY DEVICE IMPLEMENTING NETWORK FLOW PREDICTION, filed Mar. 15, 2013, now U.S. Pat. No. 9,240,975, issued Jan. 19, 2016, which is incorporated herein by reference for all purposes, which claims priority to U.S. Provisional Patent Application No. 61/758,647, entitled SECURITY DEVICE IMPLEMENTING NETWORK FLOW PREDICTION, filed Jan. 30, 2013, which is incorporated herein by reference for all purposes.

BACKGROUND OF THE INVENTION

Devices such as firewalls are sometimes used to prevent users from accessing resources to which they are not authorized. As an example, members of the public may be entitled to access content served by a web server, but not authorized to access other services available on the server such as administrative tools. In another example, employees of a company may be entitled to access certain websites or certain classes of websites while other websites or other classes of websites may be prohibited for all employees. Firewalls and other security devices typically enforce policies against network transmissions based on a set of rules.

Traditional security devices are implemented as a monolithic device provided with multiple processors for handling the incoming data streams. Such security devices often implement a centralized control scheme where one processor is designated as the management processor. Incoming data packets are often broadcast to all processors in the security device and the processors cooperate with each other, through software messaging, to determine which processor should take ownership of handling incoming data packets belonging to one or more flows. However, the centralized control scheme is not scalable to handle an increased number of data packets.

Furthermore, in a security device implemented as a distributed system, management of flow assignment needs to take into consideration different types of data traffic, including data traffic that may belong to related data connections, to ensure effective security policy enforcement across the many independent computing resources that handle the data traffic.

Finally, to implement complex security policies, a firewall needs to keep track of many independent and random events and correlate the events for policy enforcement. Firewalls or other security devices typically maintain event statistics using counters which are updated rapidly to effectively examine network traffic as the traffic is being communicated. Maintaining event statistics becomes challenging when the security device is implemented as a distributed system where events have to be detected and tracked across many independent computing resources. One method to maintain event statistics in a distributed computing environment is to rely on software to send messages between all the computing resources and try to keep synchronized copies of the event data. Such a software solution has undesirable performance and does not scale well.

BRIEF DESCRIPTION OF THE DRAWINGS

Various embodiments of the invention are disclosed in the following detailed description and the accompanying drawings.

FIG. 9 illustrates a predict flow table in embodiments of the present invention.

FIG. 11 illustrates a configuration of the global event counters 300 in embodiments of the present invention.

FIG. 12 illustrates an example event counter message that may be sent by a packet processor to the packet processing manager.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
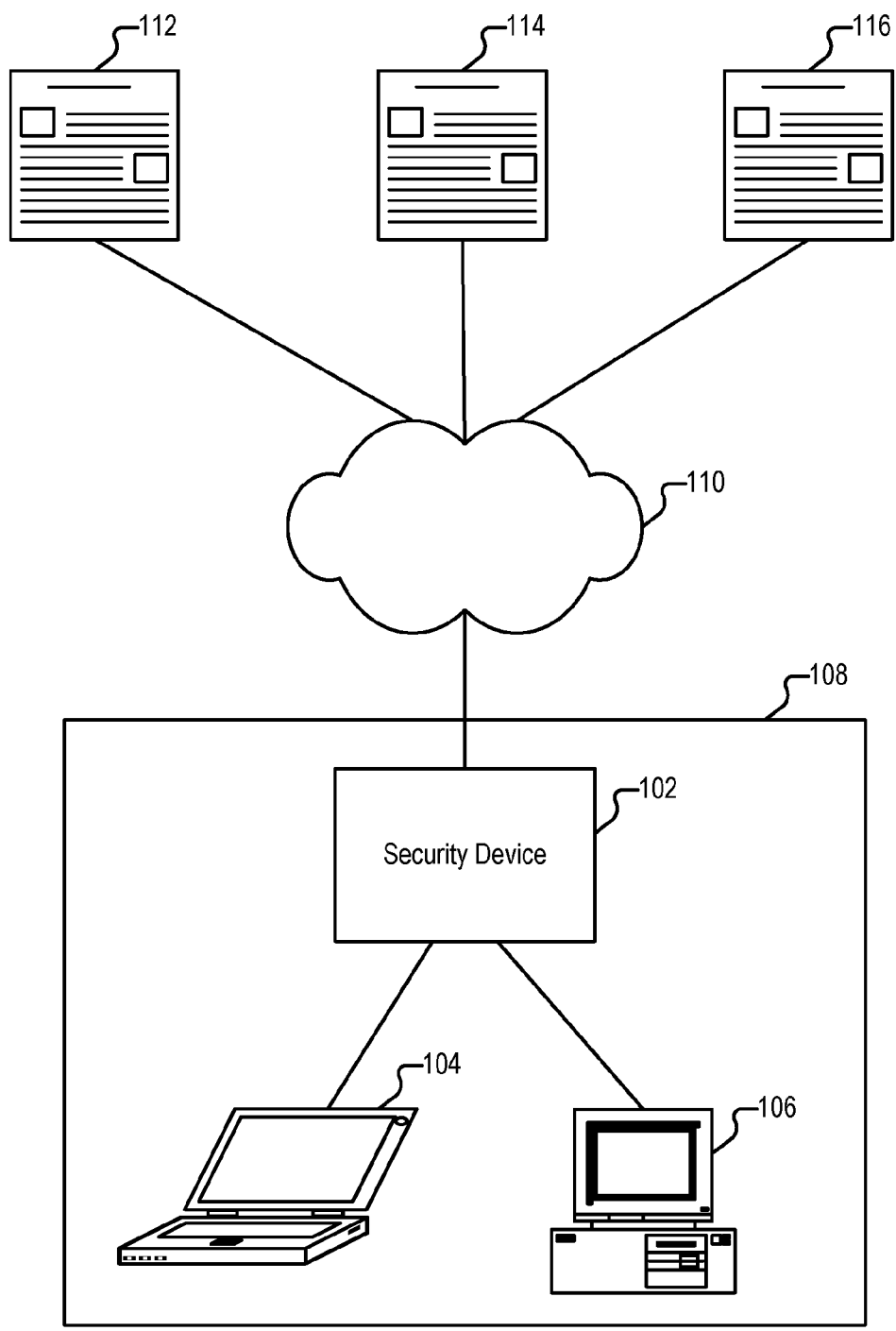
FIG. 1 illustrates an embodiment of an environment in which security policies are enforced.

FIG. 1 illustrates an embodiment of an environment in which security policies are enforced. In the example shown, clients 104 and 106 are a laptop computer and desktop computer, respectively, present in an enterprise network 108. Security device 102 (also referred to herein as "device 102") is configured to enforce policies regarding communications between clients, such as clients 104 and 106, and nodes outside of enterprise network 108 (e.g., reachable via external network 110). One example of a policy is a rule prohibiting any access to site 112 (a pornographic website) by any client inside network 108. Another example of a policy is a rule prohibiting access to social networking site 114 by clients between the hours of 9 am and 6 pm. Yet another example of a policy is a rule allowing access to streaming video website 116, subject to a bandwidth or another consumption constraint. Other types of policies can also be enforced, such as ones governing traffic shaping, quality of service, or routing with respect to URL information. In some embodiments, security device 102 is also configured to enforce policies with respect to traffic that stays within enterprise network 108.

In some embodiments, the security device 102 includes a security appliance, a security gateway, a security server, a firewall, and/or some other security device, which, for example, can be implemented using computing hardware, software, or various combinations thereof. The functionality provided by security device 102 can be implemented in a variety of ways. Specifically, security device 102 can be a dedicated device or set of devices. The functionality provided by device 102 can also be integrated into or executed as software on a general purpose computer, a computer server, a gateway, and/or a network/routing device. Further, whenever device 102 is described as performing a task, a single component, a subset of components, or all components of device 102 may cooperate to perform the task. Similarly, whenever a component of device 102 is described as performing a task, a subcomponent may perform the task and/or the component may perform the task in conjunction with other components. In various embodiments, portions of device 102 are provided by one or more third parties. Depending on factors such as the amount of computing resources available to device 102, various logical components and/or features of device 102 may be omitted and the techniques described herein adapted accordingly. Similarly, additional logical components/features can be added to system 102 as applicable.

Figure 2:
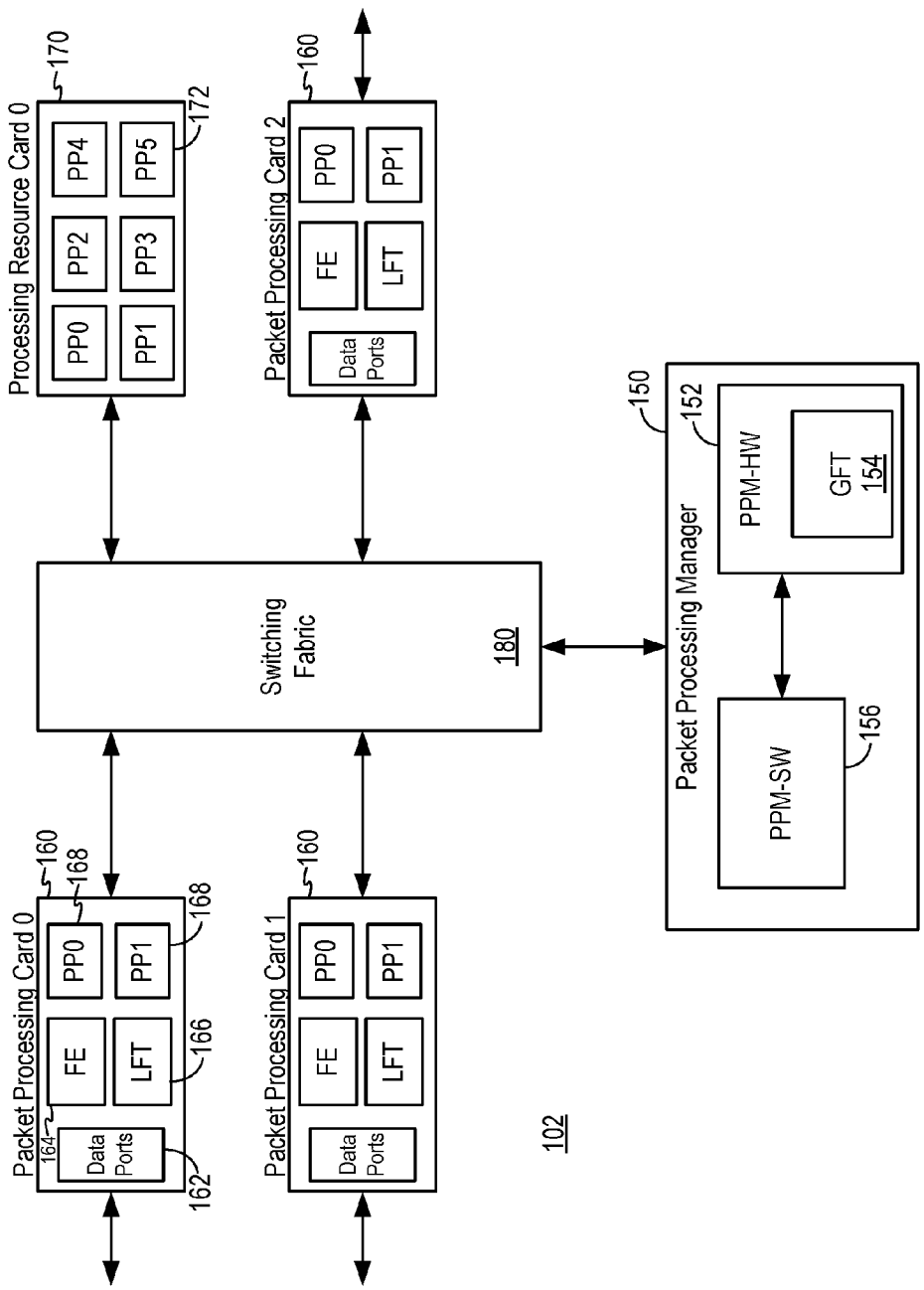
FIG. 2 is a schematic diagram of a security device in embodiments of the present invention.

FIG. 2 is a schematic diagram of a security device in embodiments of the present invention. In the example shown, the functionality of security device 102 is implemented in a firewall. Referring to FIG. 2, security device 102 is implemented as a distributed system including multiple independent computing resources. More specifically, security device 102 includes multiple packet processing cards 160 connected to a switching fabric 180. In the example shown, packet processing card 0 to card 2 are shown. Each packet processing card 160 is configured in a similar manner and includes data ports 162 for connecting to communication lines or data lines in a network, a flow engine (FE) 164 for identifying network flows associated with the received data packets, a local flow table (LFT) 166, in communication with the flow engine, for storing flow ownership assignment information, and one or more packet processors 168 for processing data packets. In the example shown, each packet processing card 160 includes two packet processors PP0 and PP1. Each packet processor in a packet processing card processes data packets that are assigned to it. In some embodiments, the packet processor 168 may be implemented as a high performance multi-core CPU.

In some embodiments, security device 102 may also include one or more processing resource cards 170 providing additional processing resources. In the example shown, security device 102 includes a single processing resource card 0 having multiple packet processors 172 formed thereon. More specifically, processing resource card 170 includes packet processors PP0 to PP5. Each packet processor in a processing resource card processes data packets that are assigned to it. Packet processors 172 may be implemented using the same processor device as packet processors 168. Processing resource cards 170 is optional and may be omitted in embodiments of the present invention.

In some embodiments, packet processing cards 160 and processing resource cards 170 are implemented as line cards in communication with a backplane. A line card or digital line card is a modular electronic circuit on a printed circuit board that interfaces with a communications backplane. Switching fabric 180 may be an integrated circuit formed on a line card, such as a management processing card (not shown), in communication with the backplane. Security device 102 may include other components not shown in FIG. 2 to implement other functionalities of the security device, such as maintaining event statistics and policy enforcement.

In security device 102, packet processing cards 160 and processing resource card 170 communicate with each other through the switching fabric 180. More specifically, security device 102 may receive incoming data packets on an input port of a packet processing card (e.g. Card 0) and forward outgoing data packets on an output port, after processing the data packets for security enforcement, through the same packet processing card (Card 0) or through a different packet processing card (e.g., Card 1). The flow engine 164 in each packet processing card 160 processes the received data packets to identify the flow associated with the received data packets so as to apply the appropriate security policy.

In the present description, a network flow or "a flow" refers to a TCP/IP flow which includes a sequence of data packets communicating information between a source and a destination in one direction. A flow identifier (or "Flow ID") for a data packet is determined from at least the information in the header of the data packet. The flow identifier is a unique value used to identify a flow in the security device 102. In some embodiments, the flow identifier is determined from the 5-tuple information of the data packet, including the source IP address, destination IP address, the source port number, the destination port number, and the protocol in use. In another embodiment, the flow identifier is determined from the 6-tuple information of the data packet which, in addition to the 5-tuple information, includes the interface being used. Furthermore, in the present description, two-way connections between a pair of network devices (e.g., client-server) are referred to as a session where a session is composed of two flows representing data traffic in both directions—that is, the forward direction (client to server) and the reverse direction (server to client).

Flow Ownership Assignment

As thus configured, security device 102 realizes a distributed processing system architecture where flow handling and packet processing are distributed to independent processing resources across the system. That is, processing of incoming data packets are distributed to different packet processors on the one or more packet processing cards and one or more processing resource cards. In a distributed processing system, data packets belonging to the same flow or to the same session may arrive at different packet processing cards. A packet processing card, receiving an incoming data packet, needs to know which packet processor 168, among the many packet processors on the same or different packet processing cards in security device 102, has been assigned ownership of the flow associated with the incoming data packet so as to forward the data packet to the owner packet processor for processing. Furthermore, in order to monitor and control data traffic effectively, information for both the forward and reverse flows of the same session should be related to each other so that a signal packet processor can inspect data packets belonging to the same session to determine whether the data packets should be forwarded, policed, or any other action taken as defined by the security policy. Accordingly, a single packet processor should be assigned ownership of flows belonging to the same session.

In embodiments of the present invention, security device 102 incorporates a packet processing manager 150 to reliably and efficiently manage flow and session ownership assignment and to provide global tracking of flow ownership in the security device. The packet processing manager centralizes flow ownership assignment in the security device and operates to distribute ownership of flows across the packet processors in the security device. More specifically, the packet processing manager implements a flow ownership assignment method to assign ownership of flows to packet processors in the security device so that data packets that belong to the same flow are processed by the same packet processor and flows belonging to the same session are also processed by the same packet processor. Furthermore, the packet processing manager maintains global flow ownership assignment information so that each packet processing card in the security device can determine the owner packet processor for each received data packet and can forward received data packets to the owner packet processor for processing.

Referring again to FIG. 2, security device 102 includes packet processing manager (PPM) 150 in communication with the switching fabric 180 to implement global flow ownership assignment and to maintain global flow ownership assignment information for all packet processing cards and processing resource cards in the security device. Packet processing manager 150 communicates with all of the packet processing cards 160 and the processing resource cards 170 in security device 102 through switching fabric 180. Packet processing manager 150 includes a hardware component PPM-HW module 152 incorporating, among other things, a global flow table 154, and a software component PPM-SW module 156 implementing ownership assignment policies. In one embodiment, Packet processing manager 150 is implemented as part of a management processing card (not shown) in the security device.

In embodiments of the present invention, packet processing manager 150 operates as the centralized resource for determining the owner packet processor for a session. In one embodiment, when a packet processing card 160 receives a data packet that is the first data packet of a new session, the data packet will be forwarded to the packet processing manager 150 to determine the packet processing card and the packet processor that should be the "owner" of the new session, responsible for processing data packets associated with the new session for policy enforcement. The packet processing manager 150 will assign the owner packet processor 168 and the owner packet processing card 160 and record the ownership assignment in the global flow table 154. The packet processing manager 150 will then forward the data packet to the assigned owner packet processor for further processing. On the other hand, when a packet processing card 160 receives a data packet that belongs to a known flow with an assigned owner packet processor, the packet processing manager 150 will forward the data packet to the owner packet processor while also informing the packet processing card that received the data packet the ownership assignment so that subsequent data packets belonging to the same flow can be forwarded autonomously from the receiving packet processing card to the owner packet processing card, without intervention of the packet processing manager.

Figure 3:
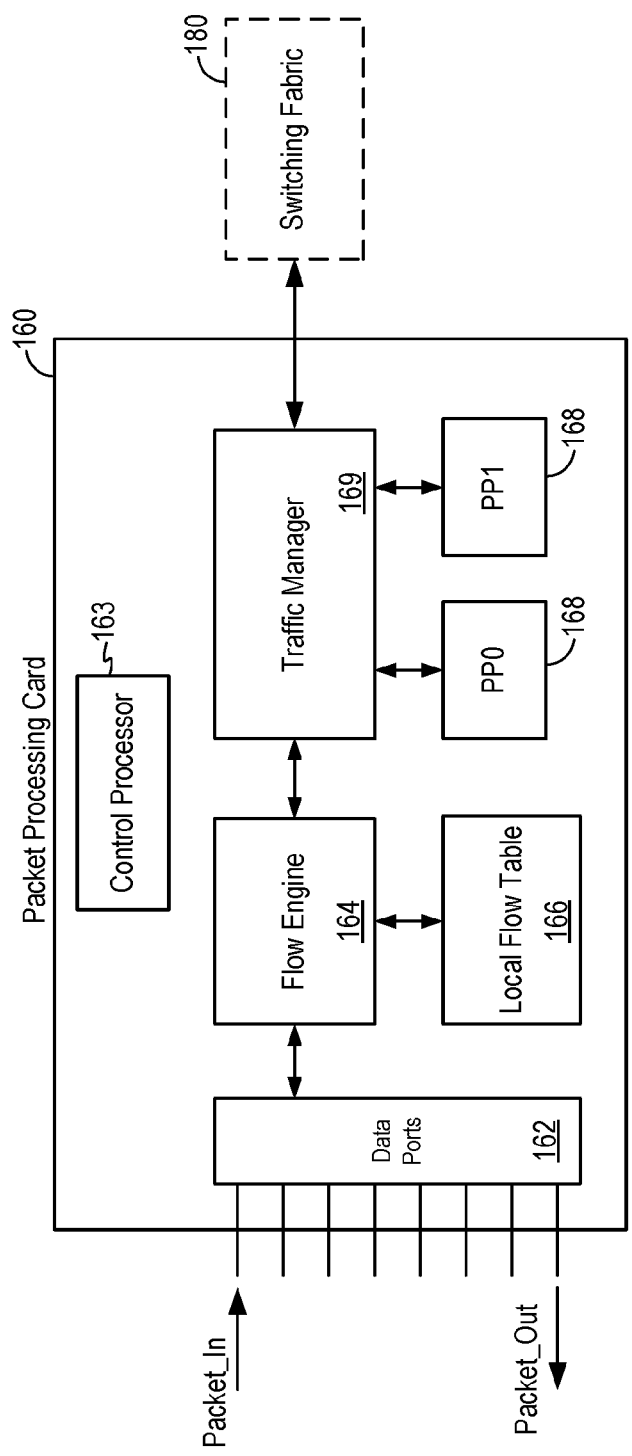
FIG. 3 is a schematic diagram of a packet processing card in embodiments of the present invention.

FIG. 3 is a schematic diagram of a packet processing card in embodiments of the present invention. Referring to FIG. 3, a packet processing card 160 includes data ports 162 for connecting to data lines in a network. The packet processing card 160 receives incoming data packets (Packet_In) and transmits outgoing data packets (Packet_Out) on the data ports. The packet processing card 160 further includes a traffic manager 169 to communicate with the switching fabric 180. The packet processing card 160 includes a flow engine (FE) 164 in communication with a local flow table (LFT) 166. Flow engine 164 performs packet parsing and flow identification for received data packets and performs flow lookup in the local flow table 166. Local flow table 166 stores flow entries identifying the packet processor ownership assignment for one or more flows associated with incoming data packets to the security device. The packet processing card 160 further includes one or more packet processors 168 for processing data packets assigned to the packet processors. In the example shown, each packet processing card 160 includes two packet processors PP0 and PP1. Finally, the packet processing card 160 includes a control processor 163 for controlling the operation of the packet processing card.

In embodiments of the present invention, packet processing card 160 may further include a flow-data flow table (not shown) storing flow records containing flow data for processing data packets associated with a flow. More specifically, a flow-data flow table may include entries storing flow records where each flow record consists of a flow identifier and its associated flow data, often referred to as a "flow attribute." Flow attributes may contain one or more rules or policy information which can be used by packet processors of the security device 102 to further process the received data packets to perform network security functions. In some embodiments, such a flow-data flow table is distinguishable from the local flow table 166 which is configured primarily to store ownership assignment information and they may be implemented as separate data tables. In other embodiments, the local flow table 166 is formed as part of the flow-data flow table. The exact configuration of the local flow table is not critical to the practice of the present invention as long as the local flow table 166 contains packet processor ownership assignment information for identified flows.

In embodiments of the present invention, the owner packet processor assignment for a flow is encoded in the flow identifier (or "Flow ID") using identification of the packet processing card and identification of the packet processor on the card. Returning to FIG. 2, in security device 102, each packet processing card is identified by a slot number (slot#), such as slot#0 for packet processing card 0, slot#1 for packet processing card 1, and slot#2 for packet processing card 2. On each packet processing card, the packet processor is identified by a processor number, such as PP0 for packet processor 0 and PP1 for packet processor 1.

The slot number and the packet processor number are used to uniquely identify one of multiple packet processors in security device 102.

Figure 4:
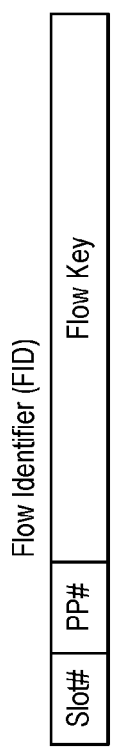
FIG. 4 illustrates a flow identifier according to one embodiment of the present invention.

FIG. 4 illustrates a flow identifier according to one embodiment of the present invention. Referring to FIG. 4, a flow identifier (FID) 185 is a globally unique value that is used to identify a flow being transmitted through the security device. The flow identifier 185 encodes information required to identify the owner packet processor. More specifically, the flow identifier 185 includes a data field for the slot number (slot#) and a data field for the packet processor number (PP#) and a field for storing a flow key associated with a flow. The flow identifier 185 may further include a data field (F/R) to identify the flow directionality (forward or reverse). In particular, the flow key uniquely identifies each flow being processed or handled in security device 102. In embodiments of the present invention, the flow key is generated from at least the information in the header of the data packet. In some embodiments, the flow key is generated from the 5-tuple or 6-tuple information of the received data packets to uniquely associate received data packets that belong to the same flow. As thus configured, the flow identifier 185 identifies a flow (by the flow key) and the owner packet processor assigned to process that flow (by the slot number slot# and the packet processor number PP#).

Figure 5:
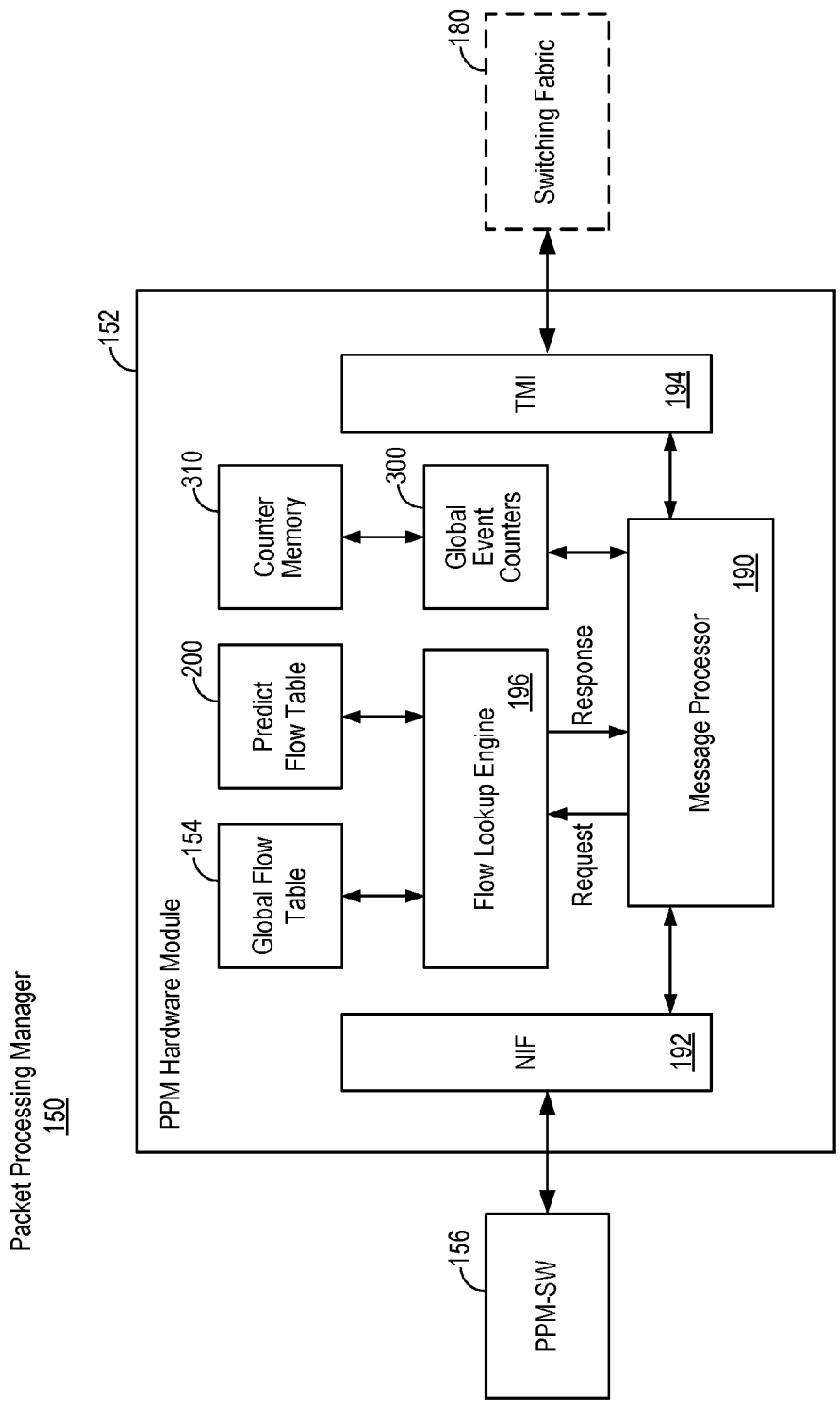
FIG. 5 is a schematic diagram of a packet processing manager in embodiments of the present invention.

FIG. 5 is a schematic diagram of a packet processing manager in embodiments of the present invention. Referring to FIG. 5, a packet processing manager 150 includes a packet processing manager hardware (PPM-HW) module 152 in communication with a packet processing manager software (PPM-SW) module 156. In the present embodiment, the software module 156 refers to a processor with instructions being executed thereon. The packet processing manager's primary responsibility is to assign and distribute flow or session ownership throughout the security device. In operation, all sessions that can be mapped as flows are sent to the packet processing manager for packet processor assignment. Subsequent packets that arrive in the security device for that flow can use the packet processing manager to learn which packet processor to send the packet for processing.

Within the packet processing manager 150, the packet processing manager hardware module 152 operates to maintain the global flow table 154 containing ownership assignment information mapping flows being processed in the security device to packet processors on the packet processing cards. The primary function of the packet processing manager software module 156 is to implement the owner assignment policy used to select an owner packet processor (PP) for a new session. Based on the owner assignment policy, the software module 156 may select an owner packet processor based on load balancing, or may select an owner randomly, or may select the packet processor in the ingress card, or other factors. A salient feature of the packet processing manager hardware module 152 is that the hardware module offloads a majority of the flow management message processing from the software module so that owner packet processor assignment can achieve a high speed of operation.

The packet processing manager hardware module 152 includes a network interface 192 for communicating with the PPM-SW module 156. In particular, the network interface 192 connects to a processor on which the packet processing manager software module 156 is run. The PPM-HW module 152 further includes a traffic manager interface (TMI) 194 connecting the hardware module to the switching fabric 180. The core function of the PPM-HW module 152 is to maintain the global flow table (GFT) 154. To that end, the PPM-HW module 152 includes a flow lookup engine 196 for accessing the global flow table 154. Lastly, the PPM-HW module 152 includes a message processor 190 for processing incoming messages from and generating outgoing messages for the PPM-SW module 156 and the packet processing cards/processing resource cards through the switching fabric. The message processor 190 generates requests to the flow lookup engine 196 and receives responses from the flow lookup engine.

In embodiments of the present invention, the packet processing manager hardware module 152 further includes a predict flow table 200 to facilitate predict flow handling. Predict flow handling is used in packet processing manager 150 to facilitate matching of connection sessions that are related so that the same owner packet processor is assigned to handle flows associated with related sessions. The operation of the predict flow table will be described in more detail below. In embodiments of the present invention, the packet processing manager hardware module 152 further includes a set of global event counters 300 for keeping track of event statistics across all packet processors in the device. The global event counters 300 is in communication with a counter memory 310. The packet processing manager 150 implements an event counter aggregation method for maintaining global counter sums for events across all packet processing cards in the distributed system. The event counter aggregation method will be described in more detail below. The predict flow table, the global event counters and the counter memory are optional elements of the packet processing manager hardware module and may be omitted in other embodiments of the present invention.

The global flow table 154 in the PPM-HW module 152 maintains a mapping of all active flows in the security device. More specifically, the global flow table 154 stores a mapping of the flow identifier assigned to each flow which specifies the owner packet processor for that flow. An example of a flow identifier is shown in FIG. 4 and described above. In this example, the flow is identified by a flow key and the owner packet processor is identified by the slot number of the packet processing card on which it is located and the packet processor number of the packet processors on that card. In some embodiments, the global flow table 154 further stores an aware mask that keeps track of all the packet processing cards in the security device that are aware of the mapping. The awareness mask is used subsequently to delete the flow from the local flow table of the packet processing cards when the session is torn down.

In one embodiment, the global flow table is implemented as a hash table with fixed size buckets. In embodiments of the present invention, the global flow table includes GFT entries where each entry includes flow key information, the flow identifier (Flow ID) and associated GFT attributes. The flow key information includes the 5-tuple information of the data packet, including the source IP address, destination IP address, the source port number, the destination port number, and the protocol in use. In some cases, the flow key information may further include the packet type, the zone identifier, or the interface being used. A flow key is generated by applying a hash function to the flow key information. A flow identifier is formed using the flow key, being a hash value of the flow key information, and the ownership assignment information for the flow, being the identification of the packet processing card and identification of the packet processor on the card. In some embodiments, GFT attributes include one or more of the following fields: a "bound" field indicating whether the entry has been bound, a "timestamp" field recording when a flow entry has been updated, an event counter identifier, and an "aware mask" field. The aware mask keeps track of all the packet processing cards in the security device that have been made aware of this flow. In some embodiments, the GFT attributes include a predict field storing a predict flag value used to indicate whether the entry has matched a predict table entry when the entry is created. The use of the predict field in a predict flow method of the present invention will be described in more detail below. The predict field is optional and may be omitted when predict flow processing is not used.

In operation, each GFT entry can be in one of the following states: invalid, tentative, and bound. A GFT entry that is invalid means that the entry can be used for a new entry allocation. A GFT entry is tentative when the entry is created upon receipt of a data packet belonging to a new flow, or a previously unknown flow. A GFT entry that is tentative includes a tentative flow identifier. The tentative flow identifier is passed to the PPM-SW module to select the appropriate owner packet processor. Any subsequent data packets having the same flow key will match the tentative entry so that the same tentative flow identifier is used. The tentative GFT entry may transition to a bound GFT entry when the owner packet processor accepts the ownership assignment and sends a message to the packet processing manager. When a GFT entry is bound, the forward and reverse flows for the session may be added to the GFT to ensure that flows belonging to the same session are assigned to the same owner packet processor. The bound data field of the GFT attributes is updated to indicate that a GFT entry has been bound.

A feature of the flow ownership assignment method of the present invention is that while the packet processing manager fills the global flow table with GFT entries for each new session received in the security device, the local flow table in each packet processing card is populated by data traffic and no additional steps are required to update owner assignment entries in the local flow table. The local flow table in each packet processing card stores part of the entries of the global flow table and only those entries required based on the data traffic received. In this manner, the local flow table in each packet processing card does not need to replicate all the entries in the global flow table.

Figure 6:
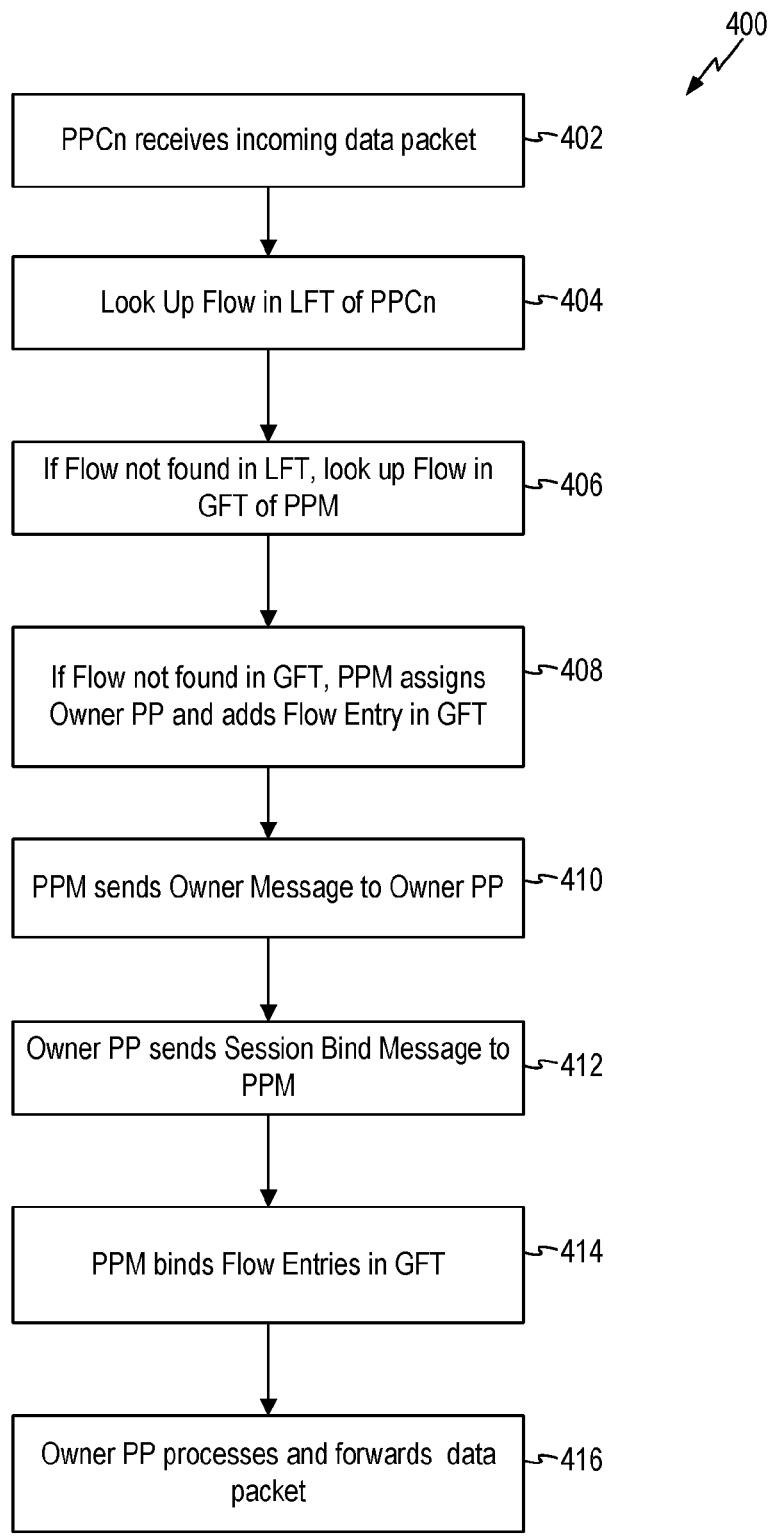
FIG. 6 is a flow chart illustrating a flow ownership assignment method according to one embodiment of the present invention.

FIG. 6 is a flow chart illustrating a flow ownership assignment method according to one embodiment of the present invention. In embodiments of the present invention, the flow ownership assignment method 400 may be implemented in security device 102 of FIG. 2 including multiple packet processing cards and a packet processing manager. Referring to FIG. 6, at 402, one of the packet processing cards (PPCn) receives an incoming data packet. The packet processing card PPCn performs a flow lookup in its local flow table (404). When the data packet belongs to a new session, no matching flow will be found in the local flow table. When a flow is not found in the local flow table, the packet is forwarded to the packet processing manager and the packet processing manager performs a flow lookup in the global flow table (406). When the flow is not found in the global flow table, the packet processing manager assigns an owner packet processor and adds a flow entry in the global flow table (408). The packet processing manager then sends an "Owner" message to the assigned owner packet processor (410). If the assigned owner packet processor is able to accept the ownership assignment, then the owner packet processor sends a "Session Bind" message back to the packet processing manager (412). Upon receipt of the session bind message, the packet processing manager binds the flow entry in the global flow table (414). In one embodiment, the owner packet processor provides forward and reverse flow information to the packet processing manager. In that case, the packet processing manager creates the reverse flow entry in the global flow table and binds both the forward and reverse flow entries in the global flow table. Finally, the owner packet processor processes the data packet and forwards the data packet after applicable policy enforcement (416).

Figure 7:
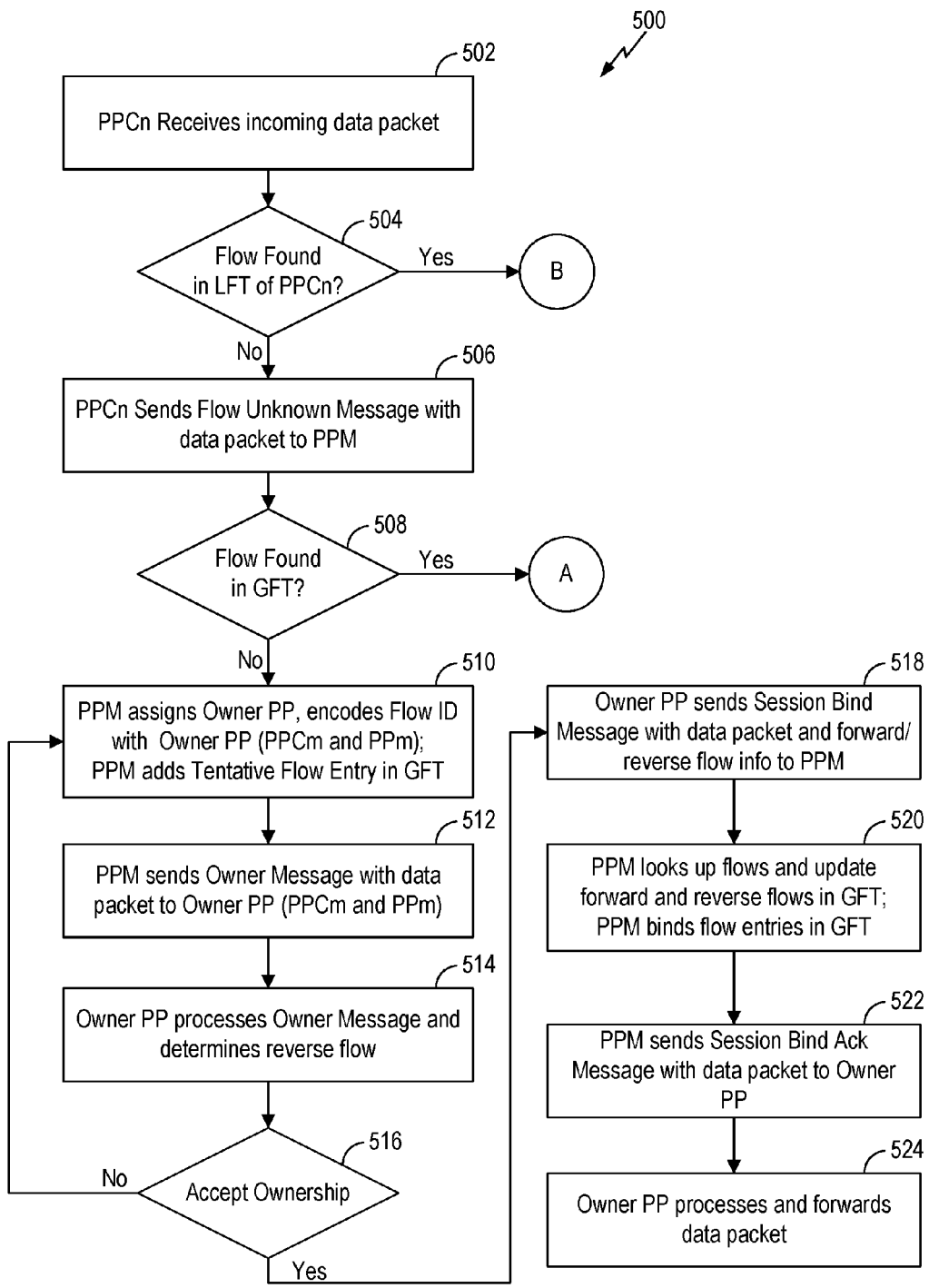
FIG. 7, which includes

FIG. 7 is a flow chart illustrating a flow ownership assignment method according to an alternate embodiment of the present invention. In embodiments of the present invention, the flow ownership assignment method 500 may be implemented in security device 102 of FIG. 2 including multiple packet processing cards and a packet processing manager. Referring to FIG. 7, at 502, one of the packet processing cards (PPCn) receives an incoming data packet. The packet processing card PPCn performs a flow lookup in its local flow table (504). When the data packet belongs to a new session, no matching flow will be found in the local flow table. When a flow is not found in the local flow table, the packet processor card PPCn that receives the data packet sends a "Flow Unknown" message with the data packet to the packet processing manager (506).

The packet processing manager performs a flow lookup in the global flow table (508). When the flow is not found in the global flow table, the packet processing manager assigns an owner packet processor to the new flow (510). In one embodiment, the assignment of an owner packet processor is performed by the software module of the packet processing manager. The software module applies policies to determine that a certain packet processor on a certain packet processing card should be the owner of the session for the new flow. For example, a packet processor PPm on a packet processing card PPCm is assigned to be the owner of the flow. When the software module returns the ownership assignment, the hardware module of the packet processing manager encodes the flow identifier of the flow with the owner packet processor identification information, such as the slot number and the packet processor number. The hardware module of the packet processing manager then adds a flow entry in the global flow table. The GFT flow entry thus added is put in a tentative state. With a tentative GFT flow entry thus created, if a second data packet of the same flow arrives before the ownership assignment becomes binding, the second data packet will be indexed to the same tentative GFT flow entry and be assigned to the same owner.

The packet processing manager then sends an "Owner" message with the data packet to the assigned owner packet processor (512). The owner packet processor processes the owner message and determines the reverse flow (514). The assigned owner packet processor also determines if it is able to accept ownership of the flow (516). The assigned owner packet processor may consider factors such as loading or memory space to determine if it can accept ownership of the flow. If not, the assigned owner packet processor sends an acknowledgement message to the packet processing manager to refuse the ownership assignment and method 500 returns to 510 where the packet processing manager determines assignment for another packet processor. When the assigned owner packet processor accepts the ownership assignment, the owner packet processor determines the reverse flow and creates local session states. The owner packet processor then sends a "Session Bind" message with the data packet and also the forward and reverse flow information to the packet processing manager (518).

Upon receipt of the Session Bind message, the packet processing manager looks up the flow for the data packet and loads the flow information, including updating the forward and reverse flow entries, in the global flow table (520). The packet processing manager then binds the flow entries in the global flow table. Then the packet processing manager sends a "Session Bind Acknowledgement" message with the data packet to the owner packet processor (522). Finally, the owner packet processor processes the data packet and forwards the data packet after applicable policy enforcement (524).

In embodiments of the present invention, when the owner packet processor sends the Session Bind message to the packet processing manager, the owner packet processor appends its loading condition to the message. In this manner, the packet processing manager collects information concerning loading at each of the packet processors and the PPM-SW module may utilize the loading information in selecting an owner for a flow.

As described above, when a new flow ownership assignment is made, only the global flow table is updated with the flow assignment information. Other packet processing cards in the security device, including the owner packet processing card, do not yet have the flow entry in their local flow tables. The local flow tables will be populated as data packets arrive at the security device. In this manner, updating of the local flow tables does not require dedicated process but rather the local flow tables are updated on-demand based on data traffic. The method for populating the local flow tables and subsequent processing is shown in FIG. 7A.

For example, returning to 502, another data packet belonging to the same flow arrives at a packet processing card, such as PPCn, which can be the same or a different packet processing card as the one previously receiving the first data packet of a new flow. For instance, the second data packet may be the acknowledgement data packet to the first data packet and arrives at the owner packet processor. Because the local flow table at the packet processing card of the owner packet processor has not yet been populated, the flow is not found in the local flow table (504). The packet processing card then sends a Flow Unknown message with the data packet to the packet processing manager (506). The packet processing manager looks in the global flow table and finds the flow associated with the data packet (508). The method 500 then continues to "A" (FIG. 7A) where the packet processing manager updates the aware mask for the flow entry and sends a "Flow Add" message to the packet processing card PPCn that send the data packet (530). The packet processing card PPCn receives the Flow Add message from the packet processing manager and adds a flow entry in its local flow table (532). In this manner, the local flow table of packet processing card PPCn is updated with the flow ownership assignment information. Meanwhile, the packet processing manager forwards the data packet to the owner packet processor for that flow (534). The owner packet processor processes the data packet and forwards the data packet after applicable policy enforcement (536).

Figure 7A:
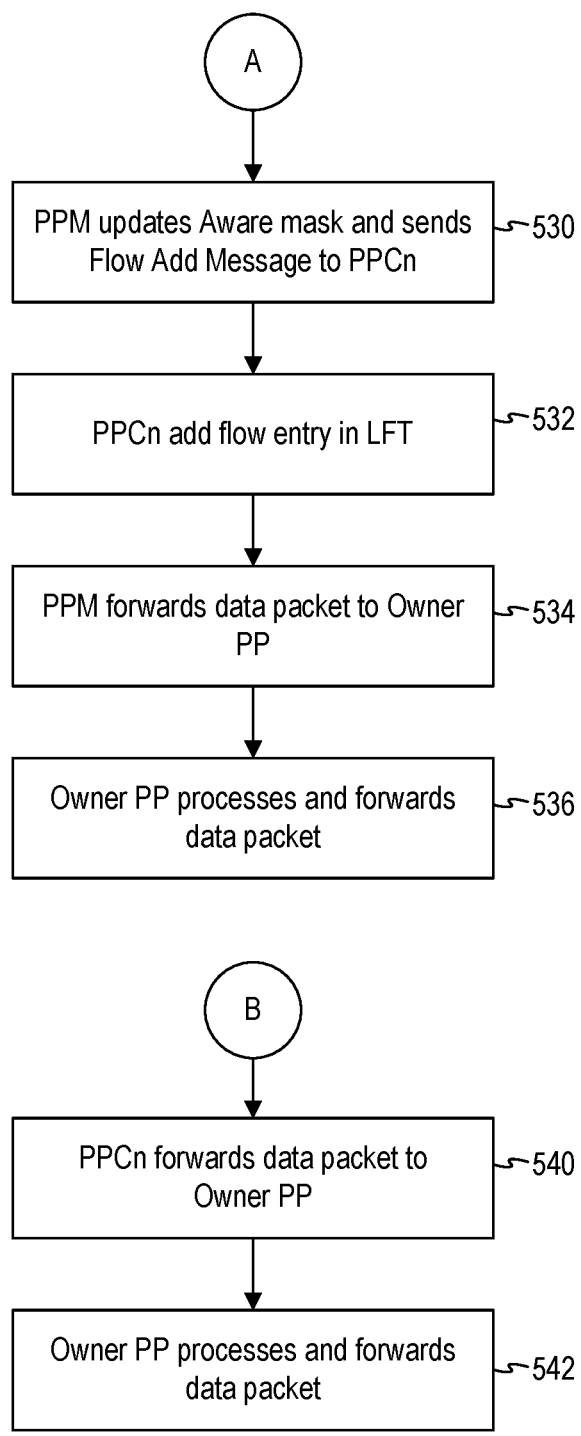
FIG. 7A, is a flow chart illustrating a flow ownership assignment method according to an alternate embodiment of the present invention.

Now, when another data packet belonging to the same flow arrives at the same packet processing card PPCn (502 in FIG. 7), the packet processing card PPCn finds the flow in the local flow table (504) and method 500 continues to "B" (FIG. 7A). The packet processing card PPCn knows the owner packet processor for the data packet based on the flow information stored in the local flow table. The packet processing card PPCn then forwards the data packet directly to the owner packet processor (540). The data packet does not need to go to the packet processing manager again. The owner packet processor processes the data packet and forwards the data packet after applicable policy enforcement (542).

The method from 530 to 536 repeats for each packet processing card receiving a data packet belonging to a flow identified in the global flow table but not yet identified in its local flow table. Each data packet causes the local flow table to be updated with the flow entry so that subsequent data packets for the same flow arriving at the same packet processing card will be identified in the local flow table of that packet processing card, without the need to go to the packet processing manager.

Accordingly, the flow ownership assignment method 500 (FIG. 7 and FIG. 7A) operates to assign ownership of flows to packet processors across the security device. In some embodiments, the packet processing manager may assign flow ownership to a packet processor on a processing resource card. The packet processors on the processing resource card processes the data packets and forwards the data packets to a packet processing card for egress out of the security device.

Figure 8:
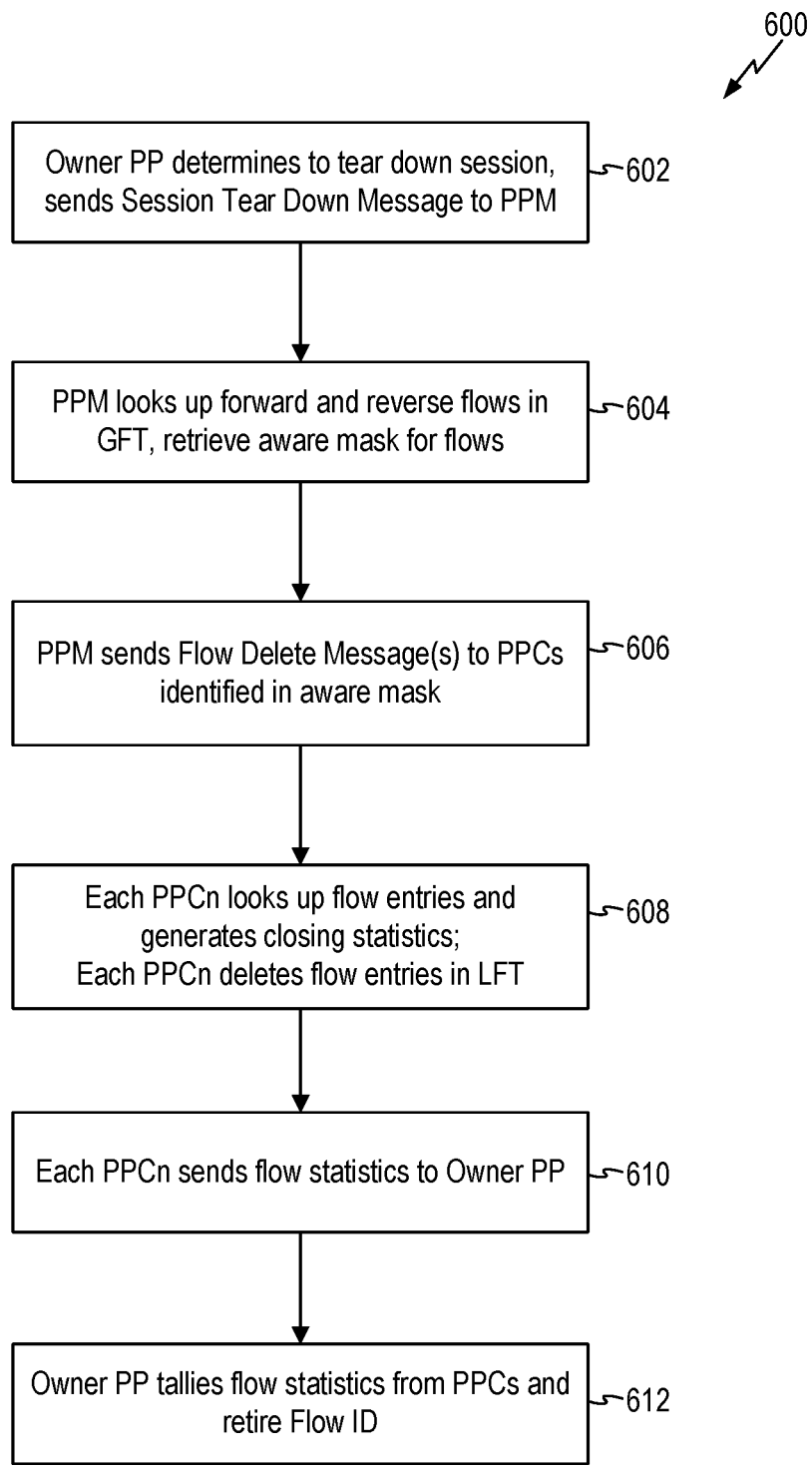
FIG. 8 is a flow chart illustrating a session teardown method according to one embodiment of the present invention.

When a connection sessions ends, the security device needs to flush out states associated with the terminated connection session. FIG. 8 is a flow chart illustrating a session teardown method according to one embodiment of the present invention. In embodiments of the present invention, the session teardown method 600 may be implemented in security device 102 of FIG. 2 including multiple packet processing cards and a packet processing manager. Referring to FIG. 8, at 602, the owner packet processor determines a connection session has ended and that any additional timeouts have expired. Thus, the session can now be torn down. The owner packet processor sends a "Session Teardown" message to the packet processing manager. Upon receipt of the session teardown message, the packet processing manager looks up the forward and reverse flow entries in the global flow table and retrieves the aware mask associated with the flows (604). The packet processing manager sends "Flow Delete" messages to the packet processing cards identified by the aware mask as having the flow added to the local flow table (606). Each packet processing card PPCn receiving the Flow Delete message looks up the flow entries and generates closing statistics. Then the packet processing card deletes the flow entries from the local flow table (608). Each packet processing card PPCn then sends flow statistics it has collected to the owner packet processor (610). The owner packet processor tallies the flow statistics from the packet processing cards and retires the flow identifier (612).

In the present embodiment, the flow ownership assignment method is implemented in a security device including multiple packet processing cards, each with one or more packet processors, and a packet processing manager provided on a separate line card. In other embodiments, the flow ownership assignment method is implemented in a security device including a single packet processing card with multiple processors. One of the processors can be assigned as the packet processing manager for ownership assignment. In that case, each processor may maintain ownership assignment information in a local memory.

Flow Prediction Method

In a data network, certain data traffic types involve multiple sessions where a "parent" session may exchange the state needed to setup subsequent "child" sessions. The FTP (file transfer protocol) is one example where a control session exchanges the information needed to open up the subsequent data connections. Voice-over-IP is another example where a connection includes a control session and a data session. To implement effective security policies and to access threats competently, the parent session and the child sessions should be handled by the same owner packet processor. In this manner, the owner packet processor can correlate state between the parent and child sessions for effective security policy enforcement.

In embodiments of the present invention, the packet processing manager performs stateful decoding of the parent session to predict the child sessions. In embodiments of the present invention, the packet processing manager includes a predict flow table 200 (FIG. 5) configured to store predict flow entries. When a child session is predicted, it is often not possible to predict the session with enough detail for a complete full entry to be made in the global flow table. For example, the packet processing manager may be able to identify the destination port from the IP address but the source port may not be known yet. Accordingly, a predict flow entry is created in the predict flow table 200 with the value of one or more data fields being unknown. In embodiments of the invention, wildcards are used in data fields of the flow identifier to indicate the value is unknown. In one embodiment, the wildcard data fields have a value of zero to indicate that the exact value of the data field is unknown.

FIG. 9 illustrates a predict flow table in embodiments of the present invention. Referring to FIG. 9, a predict flow table 200 contains a mapping of predict keys to parent flow identifiers. Four example entries 204, 206, 208 and 210 are shown in FIG. 9. The predict key may include the source address, the destination address, the source port, and the destination port. The parent flow identifier contains the flow key for the parent flow and also the slot number and packet processor number of the owner packet processor of that parent flow. A wildcard may be used in one or more of the data fields in the predict key to allow a child session to be matched to the predict flow. For example, in entry 206, the source port field is wildcard, while in entry 210, the source address is wildcard. In one embodiment, the predict key includes the 5-tuple information of a flow and one or more fields of the 5-tuple information can have a wildcard value.

Figure 10:
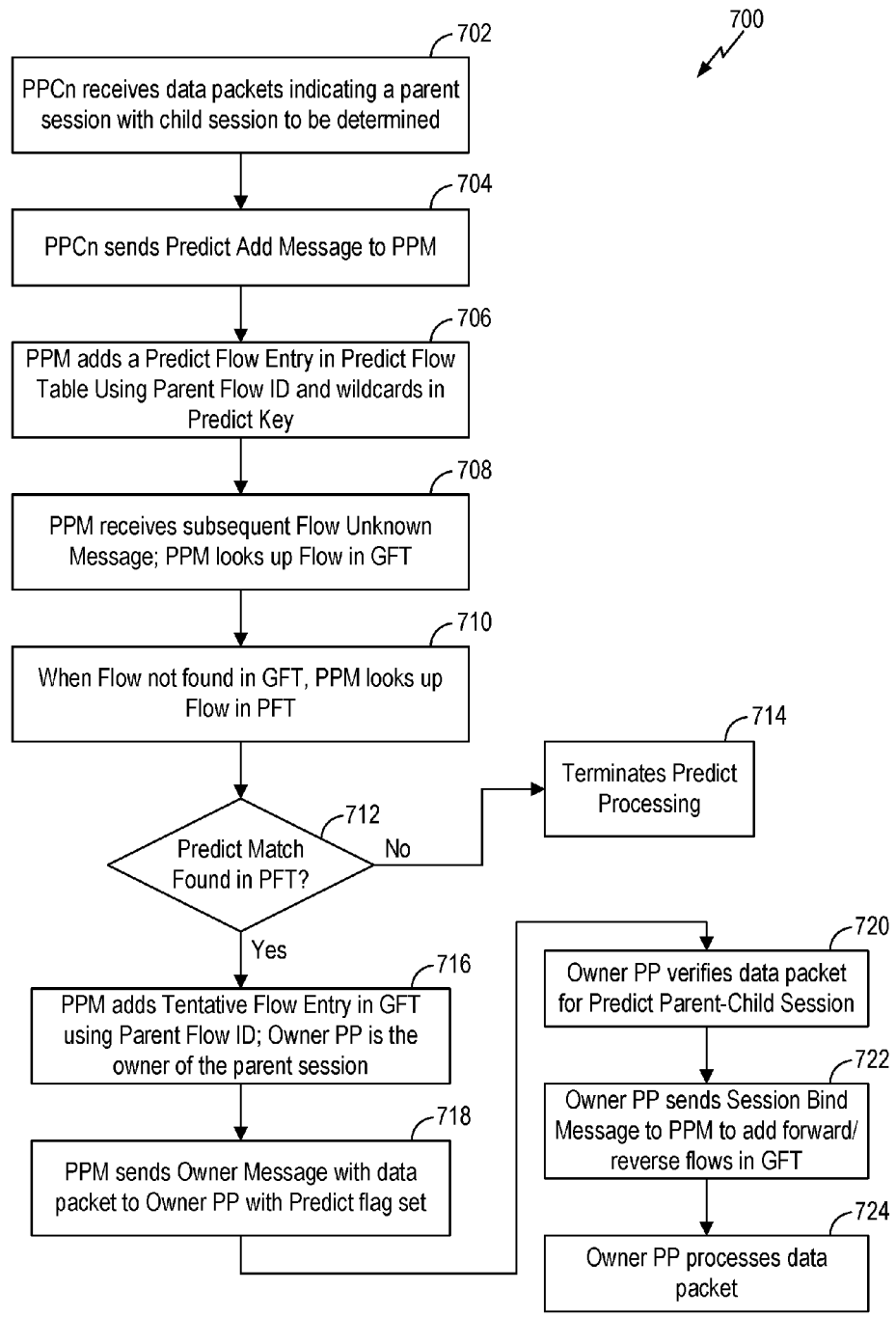
FIG. 10 is a flow chart illustrating a predict flow method according to one embodiment of the present invention.

FIG. 10 is a flow chart illustrating a predict flow method according to one embodiment of the present invention. In embodiments of the present invention, the predict flow method 700 may be implemented in security device 102 of FIG. 2 including multiple packet processing cards and a packet processing manager. Referring to FIG. 10, a packet processing card PPCn receives data packets for a connection session that indicates a parent session with a child session to be determined (702). The packet processing card PPCn sends a "Predict Add" message with the data packet to the packet processing manager (704). Upon receipt of the Predict Add message, the packet processing manager adds a predict flow entry in the predict flow table using the parent flow identifier and wildcards in the fields of the predict key (706).

Subsequently, when a data packet is received belonging to a child session, the data packet will be forwarded to the packet processing manager with a Flow Unknown message as the flow is not yet established in the global flow table or any of the local flow tables. The packet processing manager, upon receipt of the Flow Unknown message, looks up the flows in the global flow table (708). When the data packet does not match any flow entry in the global flow table, the packet processing manager looks up the flow in the predict flow table (710). In some embodiments, the table lookup for the global flow table and the predict flow table can be performed simultaneously. When a predict match is not found in the predict flow table (712), the predict processing is terminated (714) and the packet processing manager returns to normal processing for assigning an owner packet processor for the data packet.

However, when a predict match is found in the predict flow table (712), the packet processing manager adds a tentative flow entry in the global flow table using the parent flow identifier (716). In embodiments of the present invention, the global flow table further includes a predict flag indicating the entry has matched a predict table entry. For a tentative flow entry that results from a predict match, the predict flag in the entry is set. In the global flow table, the owner packet processor for the parent session will be automatically assigned as the owner packet processor for the child session. No owner assignment process needs to be performed. The packet processing manager sends an Owner Message for the new flow (child session) with the data packet to the owner packet processor (718). The Owner Message is sent with the predict flag set to indicate this is a predict match.

The owner packet processor verifies the new flow as belonging to the predicted parent-child session (720). When the new flow is verified, the owner packet processor sends a Session Bind message to the packet processing manager (722). The packet processing manager adds the forward and reverse flows in the global flow table and binds the flow entries of the now resolved session. The owner packet processor then processes the data packet and applies security policy (724). In this manner, sessions that have a parent-child relationship are assigned to the same owner packet processor so that they can be policed accordingly.

In embodiments of the present invention, the predict flow table 200 is implemented using a content-addressable memory (CAM). In particular, in one embodiment, the predict flow table 200 is implemented as a ternary CAM or TCAM which allows for a matching state of "Don't Care" or wildcard for one or more bits in the stored dataword. In other embodiments, the predict flow table and the global flow table are formed as separate logical components of the same memory device.

Furthermore, in embodiments of the present invention, the predict flow entry is deleted once a child session is matched. In most cases, the predict flow entries have a short life-span as the child session is usually created within a very short time frame from the parent session.

Event Aggregation in a Distributed System

In a security device implemented as a distributed system, the security device needs to keep track of events across all packet processors in the system in order to implement coordinated security policies. In embodiments of the present invention, a security device uses a hardware offload engine to manage messages between the independent and distributed processing resources so as to maintain event statistics effectively in a distributed system. In embodiments of the present invention, the security device implements a multicast push notification scheme to monitor event counts that have exceeded a given threshold. The hardware offload engine and the multicast push notification scheme reduce software overhead for event statistics management.

Returning to FIG. 5, to facilitate coordination of event statistics across the distributed system, the packet processing manager is implemented with a set of global event counters 300 in communication with a counter memory 310. The global event counters 300 provide a large number of counters that can be configured by software with each counter being identified by a global counter identifier. Once configured, any packet processor in the security device can send a message to the packet processing manager to increment, decrement, or simply query the counter value of one or more events. In addition, the event counters can be configured with thresholds and when a counter value sum exceeds its corresponding threshold, the packet processing manager will cause messages to be sent to a group of packet processing cards that are providing the counter values for the event.

In one embodiment, the packet processing manager includes the message processor 190 to implement message based communication with the packet processor cards over the switching fabric. The message processor 190 is capable of both unicast and multicast message exchange. As will be explained in more detail below, the message processor 190 handles multicast push notification to the packet processing cards in response to the status of the event counters.

FIG. 11 illustrates a configuration of the global event counters 300 in embodiments of the present invention. Referring to FIG. 11, the set of global event counters maintained by the packet processing manager includes accumulative counters 850, also referred to as accumulators. Accumulators 850 are used to sum events across all the packet processors in the security device and present a global indication that a counter threshold has been met. Each accumulator for an event is identified by a counter identifier (counter ID) and is associated with a global threshold value and a global counter sum. In some embodiments, the global threshold value includes a high threshold value and a low threshold value. Accumulators 850 are a table capable of storing a large number of event counters for the events being processed by the security device.

In a distributed system, accumulating errors can occur when summing event counts across the packet processors, such as when an event counter message is lost or a packet processor restarts. To avoid accumulating error, the packet processing manager maintains the counter memory 310 of FIG. 5 for storing local values of each event counter for each packet processor reporting count values. The local values of an event counter stored in the counter memory 310 are referred to as instances of the event counter or an Accumulator Instance Counter (AIC). FIG. 11 illustrates three examples of Accumulator Instance Counters 870a-c. AIC 870a stores local counter values for an event 1, AIC 870b stores local counter values for an event 2, and AIC 870c stores local counter values for an event 3. The sum of the local counter values is the counter sum stored in the global event counters corresponding to each event.

As thus configured, each packet processor sends, via an event counter message, its current value for an event counter instead of an increment value. The packet processing manager processes the current counter value sent by a packet processor and stores the updated current value for that packet processor for that event in the respective AIC. Thus, any error that may lead to a count error, such as a lost message or a packet processor restarting, is only transient and the counter sum will correct itself when the packet processor sends the next updated current counter value with the correct counter value.

The set of global event counters maintained by the packet processing manager further includes rate counters 860. Rate counters 860 track the number of times an event occurs in a set time frame. Each rate counter for an event is identified by a counter identifier (counter ID) and is associated with a global threshold value, a global maximum value and a global fill rate. Rate counters 860 are formed as a table capable of storing a large number of event counters for the events being processed by the security device. In embodiments of the present invention, the rate counters 860 are implemented as token buckets. Accordingly, the rate counter for each event counter specifies the maximum number of tokens that will fit in the bucket and the fill rate in tokens per second.

In operation, an event query is sent by a packet processor which attempts to acquire one or more tokens. If the query is successful, then the packet processor can assume that the event is occurring at a conforming state. If the fill rate has exceeded the threshold, the event query will receive a non-acknowledgement response, indicating that the event is non-conforming.

FIG. 12 illustrates an example event counter message that may be sent by a packet processor to the packet processing manager. Referring to FIG. 12, an event counter message 900 includes the event counter identifier (counter ID) to identify the event counter the message intends for. The message 900 further includes a group identifier to indicate the group of packet processors currently reporting count value for that event. The message further includes a count value which is the total local counter value for that event.

A packet processor may send the event counter message 900 to the packet processing manager to perform the following tasks: (1) to allocate an event counter (accumulator or event rate counter) and return a counter identifier; (2) to update specified event counter via set, increment, or decrement operations; and (3) to release an event counter by providing the count identifier.

In one embodiment, to avoid accumulating errors when aggregating event count values from multiple sources, each packet processor reports its total local counter value and uses the Set commend. The packet processing manager updates the global counter sum by first subtracting the previous local counter value stored in the respective AIC and then adding the current local counter value provided in the message. In this manner, any error in the total local counter value will only be transient and will be corrected at the next counter value update.

In embodiments of the present invention, each event counter message can be configured to handle multiple event counters so that a single message can be sent to ensure all events are conforming before the packet processor creates sessions.

Figure 13:
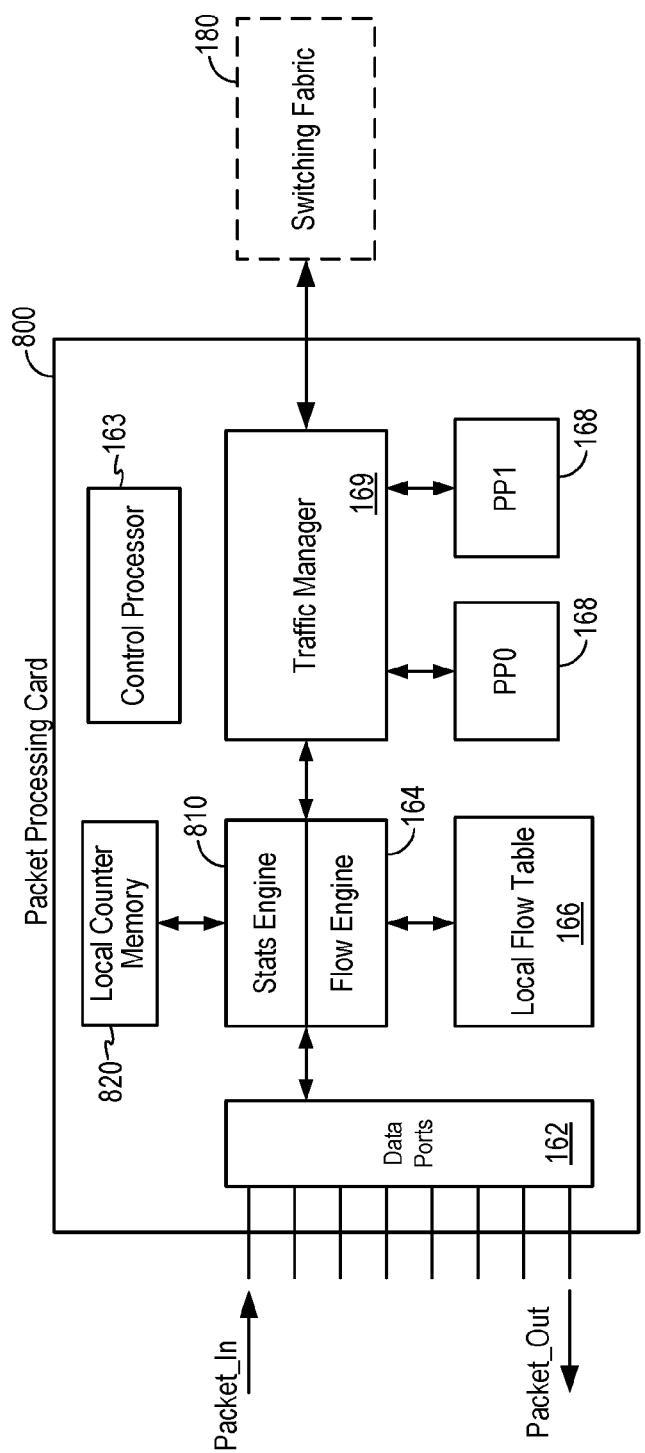
FIG. 13 is a schematic diagram of a packet processing card in an alternate embodiment of the present invention.

In embodiments of the present invention, each packet processing card in the security device stores local counter values for the event counters it is maintaining so that the packet processors on the card do not have to send count value updates continuously. FIG. 13 is a schematic diagram of a packet processing card in an alternate embodiment of the present invention. The packet processing card in FIG. 13 is constructed in a similar manner as the packet processing card 160 in FIG. 3 and like elements are given like reference numbers and will not be further described. Referring to FIG. 13, a packet processing card 800 includes a statistics engine (stats engine) 810 for maintaining event statistics for flows handled by the packet processing card. The stats engine 810 is in communication with a local counter memory 820. The local counter memory 820 stores local values of event counters associated with the flows the packet processing card is processing.

In embodiments of the present invention, the local counter memory stores the local counter values for each event counter and also a local threshold value. When the local counter value for an event reaches the local threshold value, the stats engine 810 sends an event counter message to the packet processing manager to update the global count sum. In this manner, the stats engine 810 only needs to update the global counter sum periodically and latency in the security device due to event counter messages is minimized. In one embodiment the local threshold value is selected so that even when the local threshold value for an event is exceeded on all the packet processing cards processing the same event, the global counter sum for that event is still below that of the policy enforcement limit.

Multicast Push Notification

In embodiments of the present invention, the packet processing manager implements a multicast push notification scheme to notify packet processors when an event counter has exceeded a global threshold. As described above, an event counter in the global event counters, such as accumulators 850 or rate counters 860, is associated with a global threshold value. When the global threshold value is exceeded by the global counter sum, the packet processing manager sends a multicast notification message to the interested packet processors indicating the event counter identifier and that the event count has entered a non-conforming state. In embodiments of the present invention, the interested packet processors are those identified by the group identifier in the event count message as belonging to the group of packet processors that are keeping track of statistics of that event counter.

Each packet processor, upon receipt of the multicast notification message, transitions the local state for that event count to the non-conforming state. When an event counter is in a conforming mode, the counter value update messages for the group of packet processors are sent asynchronously where each packet processor reports a count value when the count value reaches the local threshold. Also, the packet processor may create a new connection session independently without consulting with the packet processing manager or other management processor.

However, when the event counter is in a non-conforming state, the packet processors have to query the packet processing manager for the global counter sum. Each packet processor has to wait for a response to its query before proceeding with decisions based on event states. Furthermore, the packet processors report the local counter values to the packet processing manager more frequently.

As the packet processors make queries of the global count sum, the global count sum for that event counter may drop below the threshold and re-enter a conforming state. When this occurs, the packet processing manager sends a multicast message to the interested packet processors informing them that the event counter is now in a conforming state and the packet processors can return to an asynchronous mode of operation.

In one embodiment, the global threshold value comprises a high threshold value and a low threshold value. When the global counter sum exceeds the high threshold value, the event counter enters the non-conforming state. Once the global counter sum exceeds the high threshold value, the global counter sum has to drop before the low threshold value before the event counter can return to the conforming state. The hysteresis provided by the high threshold value and the low threshold value ensures that an event counter does not chatter between the conforming and non-conforming states.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A security device for processing a plurality of network flows, comprising:

one or more packet processors configured to receive incoming data packets associated with one or more network flows, at least one of the packet processors being assigned as an owner of one or more network flows, and each packet processor processing data packets associated with flows for which it is the assigned owner and each network flow being assigned to only one owner packet processor, each owner packet processor processing data packets associated with a network flow to enforce a security policy; and a packet processing manager configured to assign ownership of network flows to the one or more packet processors, the packet processing manager comprising a global flow table containing global flow table entries mapping network flows to owner packet processors and a predict flow table containing predict flow entries mapping predicted network flows to the owner packet processors assigned to parent flows for connection sessions that indicate child flows to be determined, wherein in response to a first data packet being received by one of the one or more packet processors and being associated with a first parent flow for a connection session that indicates a first child flow to be determined, the packet processing manager adds a first predict flow entry in the predict flow table, the first predict flow entry mapping a predicted network flow to the packet processor assigned as the owner of the first parent flow, and in response to a second data packet being received by one of the one or more packet processors and the network flow for the second data packet being found in the predict flow table as matching the first predict flow entry, the packet processing manager adds an entry in the global flow table to map the network flow of the second data packet to the owner packet processor of the first parent flow; and in response to receiving a message from the owner packet processor indicating acceptance of the ownership assignment, the packet processing manager stores a binding entry in the global flow table mapping the network flow of the second data packet to the owner packet processor of the first parent flow.

2. The security device of claim 1, wherein each predict flow entry comprises a predict key mapping to a parent flow identifier, the predict key identifying in part a predicted network flow being a child flow corresponding to a parent flow in a connection session and the parent flow identifier identifying the parent flow corresponding to the child flow and the owner packet processor assigned to the parent flow, the child flow being derived from information relating to the parent flow, the predict key comprising a plurality of data fields identifying the predicted network flow where the value of one or more of the data fields is unknown.

3. The security device of claim 2, wherein the predict key comprises the 5-tuple information of a predicted network flow where one or more of the 5-tuple information has an unknown value.

4. The security device of claim 2, wherein the first predict flow entry maps the first predict key identifying the first child flow to a parent flow identifier associated with the first parent flow, the parent flow identifier being indicative of the packet processor ownership assignment associated with the first parent flow.

5. The security device of claim 1, wherein the parent flow and the child flow comprise a file transfer protocol session or a voice-over-IP session.

6. The security device of claim 1, wherein the parent flow comprises a control session and the child flow comprises a data session associated with the control session.

7. The security device of claim 1, wherein a packet processor forwards a received data packet to the packet processing manager in response to no entry for a network flow being found in a local memory, the packet processing manager looks up the network flow in the global flow table and the predict flow table.

8. The security device of claim 1, wherein the predict flow table comprises a ternary content-addressable memory (TCAM).

9. The security device of claim 1, further comprising:
one or more packet processing cards, each having one or more packet processors formed thereon, each packet processing card having a data port for receiving and transmitting data packets and a local flow table; and
a switching fabric in communication with the one or more packet processing cards and the packet processing manager,
wherein the one or more packet processing cards learn of ownership assignments of network flows from the packet processing manager as data packets are being received, the local flow table stores entries mapping network flows to owner packet processors where ownership assignments are learned from the packet processing manager.

10. A method for processing a plurality of network flows in a security device comprising a plurality of packet processing cards communicating through a switching fabric, each packet processing card including one or more packet processors, the method comprising:
receiving, at the one or more packet processors, incoming data packets associated with one or more network flows, at least one of the packet processors being assigned as an owner of one or more network flows, and each packet processor processing data packets associated with flows for which it is the assigned owner and each network flow being assigned to only one owner packet processor, each owner packet processor processing data packets associated with a network flow to enforce a security policy;
receiving a first data packet at a packet processing card, the first data packet being associated with a first network flow indicative of a parent flow of a connection session that indicates a child flow to be determined;
assigning a first packet processor of the one or more packet processors as an owner of the first network flow;
sending a message to a packet processing manager to add a predict flow entry;
adding a first predict flow entry in a predict flow table mapping a predicted network flow to the first packet processor as the owner packet processor of the first network flow being the parent flow associated with the first data packet;
receiving a second data packet at a packet processing card;
forwarding the second data packet to the packet processing manager;
looking up a network flow for the second data packet in the predict flow table;
in response to the network flow for the second data packet being found in the predict flow table and matching the first predict flow entry, adding an entry in a global flow table of the packet processing manager mapping the network flow of the second data packet to an owner packet processor, the entry being added identifying the first packet processor as the owner packet processor of the second data packet;
sending a message from the packet processing manager to the owner packet processor informing the assigned packet processor of the ownership assignment of the second data packet;
receiving a message at the packet processing manager from the owner packet processor indicating acceptance of the ownership assignment;
storing a binding entry in the global flow table mapping the network flow of the second data packet to the owner packet processor; and
processing the second data packet at the owner packet processor.

11. The method of claim 10, wherein adding the first predict flow entry in a predict flow table comprises:
adding the first predict flow entry in a predict flow table using a predict key having a plurality of data fields to identify the predicted network flow being a child flow corresponding to the parent flow where the value of one or more of the data fields has wildcard values, the child flow being derived from information relating to the parent flow.

12. The method of claim 10, wherein looking up the network flow for the second data packet in the predict flow table comprises:
looking up the network flow for the second data packet in the predict flow table and the global flow table.

13. The method of claim 10, wherein looking up the network flow for the second data packet in the predict flow table comprises:
looking up the network flow for the second data packet in the predict flow table and the global flow table simultaneously.

14. The method of claim 10, wherein receiving the first data packet at the packet processing card comprises:
receiving a data packet at a packet processing card, the data packet being associated with a parent session with a child session to be determined, the predict flow entry being made for the child session to be determined.

15. The method of claim 14, wherein the parent flow and the child flow comprise a file transfer protocol session or a voice-over-IP session.

16. The method of claim 14, wherein the parent flow comprises a control session and the child flow comprise a data session associated with the control session.

17. The method of claim 10, wherein the predict key comprises the 5-tuple information of a predicted network flow where one or more of the 5-tuple information has an unknown value.

18. The method of claim 10, further comprising:
receiving a third data packet at a packet processing card;
in response to a network flow associated with the third data packet being found in the global flow table, sending a message from the packet processing manager to the packet processing card receiving the third data packet informing the receiving packet processing card the ownership assignment for the network flow;
adding an entry in a local flow table of the packet processing card receiving the third data packet, the entry mapping the network flow to the owner packet processor;
forwarding the data packet from the packet processing manager to the owner packet processor; and
processing the data packet at the owner packet processor.

* * * * *